(12) United States Patent
Williams

(10) Patent No.: US 9,452,688 B2
(45) Date of Patent: Sep. 27, 2016

(54) MAGNETIC RAIL BOND

(76) Inventor: Mark A. Williams, Sycamore, IL (US)

(*) Notice: Subject to any disclaimer, the term of this patent is extended or adjusted under 35 U.S.C. 154(b) by 353 days.

(21) Appl. No.: 12/713,321

(22) Filed: Feb. 26, 2010

(65) Prior Publication Data

US 2010/0219256 A1  Sep. 2, 2010

Related U.S. Application Data

(60) Provisional application No. 61/156,189, filed on Feb. 27, 2009.

(51) Int. Cl.
*B60M 5/00* (2006.01)
*H01R 13/62* (2006.01)

(52) U.S. Cl.
CPC ............ *B60M 5/00* (2013.01); *H01R 13/6205* (2013.01)

(58) Field of Classification Search
CPC ........... B60M 5/00; B60M 5/02; E01B 11/54
USPC ................. 238/14.05, 14.2, 14.4, 14.5, 14.6, 238/14.12, 14.13, 14.14
See application file for complete search history.

(56) References Cited

U.S. PATENT DOCUMENTS

| | | | |
|---|---|---|---|
| 1,843,501 A | | 2/1932 | Baldwin |
| 2,204,396 A | * | 6/1940 | Barnes et al. .................. 439/39 |
| 2,582,937 A | | 1/1952 | Bovard |
| 2,795,442 A | | 6/1957 | Wilson |
| 2,830,768 A | * | 4/1958 | Boaz .......................... 238/14.05 |
| 3,058,764 A | | 10/1962 | Scott et al. |
| 3,899,825 A | * | 8/1975 | Hofer ............................ 228/107 |
| 4,102,497 A | | 7/1978 | Lowerre |
| 4,114,262 A | | 9/1978 | Franck |
| 5,148,981 A | | 9/1992 | Lynch et al. |
| 5,538,174 A | | 7/1996 | Gaman |
| 5,810,136 A | * | 9/1998 | Siciliano et al. ............... 191/18 |
| 7,298,136 B1 | | 11/2007 | Curtis |
| 2006/0032933 A1 | | 2/2006 | Reichle |
| 2008/0217042 A1 | | 9/2008 | Judson |

FOREIGN PATENT DOCUMENTS

DE     3218558 A1    12/1982

OTHER PUBLICATIONS

Notification of Transmittal of the International Search Report and the Written Opinion of the International Searching Authority, in International application No. PCT/US2010/032553, dated Dec. 1, 2011 (9 pages).

(Continued)

*Primary Examiner* — R. J. McCarry, Jr.
(74) *Attorney, Agent, or Firm* — Freeborn & Peters LLP

(57) ABSTRACT

Magnetic means and apparatus for implementing rail bonds and rail feeds. A rail bond embodiment comprises an electrical conductor. Mechanically and electrically coupled to each end of the electrical conductor is a magnet that comprises a magnetic material that is plated with an electrically conductive material. In an alternative embodiment, the magnet comprises a magnetic material that is disposed between two pieces of steel or other metal. In operation, the two magnets are attached to two rail sections, across a joint separating the rails, via the attractive magnetic force between each magnet and its associated rail. In this way, the electrical circuit comprising the rails is maintained.

21 Claims, 7 Drawing Sheets

(56) References Cited

OTHER PUBLICATIONS

Brady et al. "Materials Handbook" McGraw Hill, Inc.,13th ed., 1991, pp. 505-509.

Cardarelli, "Materials Handbook: A Concise Desktop Reference" Springer, 2nd ed., 2008, pp. 510-512.

* cited by examiner

MAGNETIC RAIL BOND

CROSS-REFERENCE TO RELATED APPLICATIONS

This application claims priority to U.S. Provisional Patent Application 61/156,189, filed on Feb. 27, 2009, the contents of which are hereby expressly incorporated herein by reference.

BACKGROUND OF THE INVENTION

The rails of a railroad track are sometimes used as electrical conductors that carry electrical signals. For example, track circuits are used to detect the presence or absence of a train on rail tracks. This information can then be used to inform signalers and control relevant signals. In a typical track circuit, power is applied to each rail at one end of a section of track, such as a block. An electrical relay is electrically coupled across the rails at an opposite end of the section of track. When no train is present, the relay is energized by the current flowing through the rails. When a train is present, its wheels and axle electrically short the circuit formed by the rails. This causes the current to the relay to drop, and the relay is de-energized. The state of the relay can therefore be used to indicate whether a train is present on the section of track.

Rail feeds are used to effect an electrical connection between a rail and, for example, a control unit. The rail feed can be used to transmit an electrical signal on, or receive an electrical signal from, the rail. Rail bonds are used to electrically couple longitudinally adjacent lengths of rail, as there is typically a gap between the rail ends.

Various methods are and have been used to implement rail feeds and rail bonds. One method is to mechanically connect an electrical conductor via a hole that is formed in the rail. Such a mechanical connection can take the form of a bolt or a screw, for example. This hole can be formed, for example, by drilling or pounding. This drilling or pounding can cause a flaw in the rail, making the rail more likely to fail or break. Another method is to weld an electrical conductor to the rail. The heating of the rail that is inherent in the welding process can also cause flaws in the rail, again making the rail more likely to fail or break. Other methods include pin brazing and gluing. These methods suffer from their own disadvantages including low reliability. Further limitations and disadvantages of conventional and traditional approaches will become apparent to one of skill in the art through comparison of such systems with the present invention as set forth in the remainder of the present application with reference to the drawings.

SUMMARY OF THE INVENTION

An illustrative embodiment of the present invention is directed to a method of forming an electrical connection between an electrical conductor and a railway rail. Pursuant to said method, an electrically-conductive magnet assembly coupled to an end of an electrical conductor is provided. The electrically-conductive magnet assembly is coupled to a railway rail via magnetic force. The magnetic coupling of the magnet assembly to the rail causes the rail to be electrically coupled to the electrically-conductive magnet assembly, and, in turn, to the electrical conductor. In one embodiment of the invention, a second end of the electrical conductor is coupled to control circuitry operable to transmit an electrical signal to the rail via the electrical conductor and the electrically-conductive magnet assembly.

Another illustrative embodiment of the present invention is directed to a rail feed apparatus that includes an electrically-conductive magnet assembly and an electrical conductor coupled to the electrically-conductive magnet assembly. In one embodiment of the invention, the electrically-conductive magnet assembly comprises a ferromagnetic material plated with an electrically-conductive material.

Another illustrative embodiment of the present invention is directed to a method of forming an electrical connection between railway rails. Pursuant to this method, a rail bond is provided which includes an electrical conductor, a first electrically-conductive magnet assembly coupled to a first end of the electrical conductor, and a second electrically-conductive magnet assembly coupled to a second end of the electrical conductor. The first electrically-conductive magnet assembly is coupled to a first railway rail via magnetic force. The magnetic coupling of the first magnet assembly to the first rail causes the first rail to be electrically coupled to the first electrically-conductive magnet assembly, and, in turn, to the electrical conductor. The second electrically-conductive magnet assembly is coupled to a second railway rail via magnetic force. The magnetic coupling of the second magnet assembly to the second rail causes the second rail to be electrically coupled to the second electrically-conductive magnet assembly, and, in turn, to the electrical conductor. In one embodiment of the invention, the first railway rail is longitudinally adjacent to the second rail.

Another illustrative embodiment of the present invention is directed to a rail bond that includes an electrical conductor and two electrically-conductive magnet assemblies. The first electrically-conductive magnet assembly coupled to a first end of the electrical conductor, and the second electrically-conductive magnet assembly coupled to a second end of the electrical conductor. In one embodiment of the invention, the electrically-conductive magnet assemblies each comprise a ferromagnetic material plated with an electrically-conductive material.

DETAILED DESCRIPTION OF THE INVENTION

Illustrative embodiments of the invention will be described with respect to the drawings. The drawings and the associated descriptive text show and describe, by way of illustration, specific implementations of the present invention. Other examples of implementations may be utilized and structural changes can be made without departing from the scope of the invention.

In general, the present invention comprises rail a bond apparatus utilizing a magnetic coupling of an electrical conductor to a railroad rail and methods of magnetically coupling an electrical conductor to a railroad rail.

Figure 1:
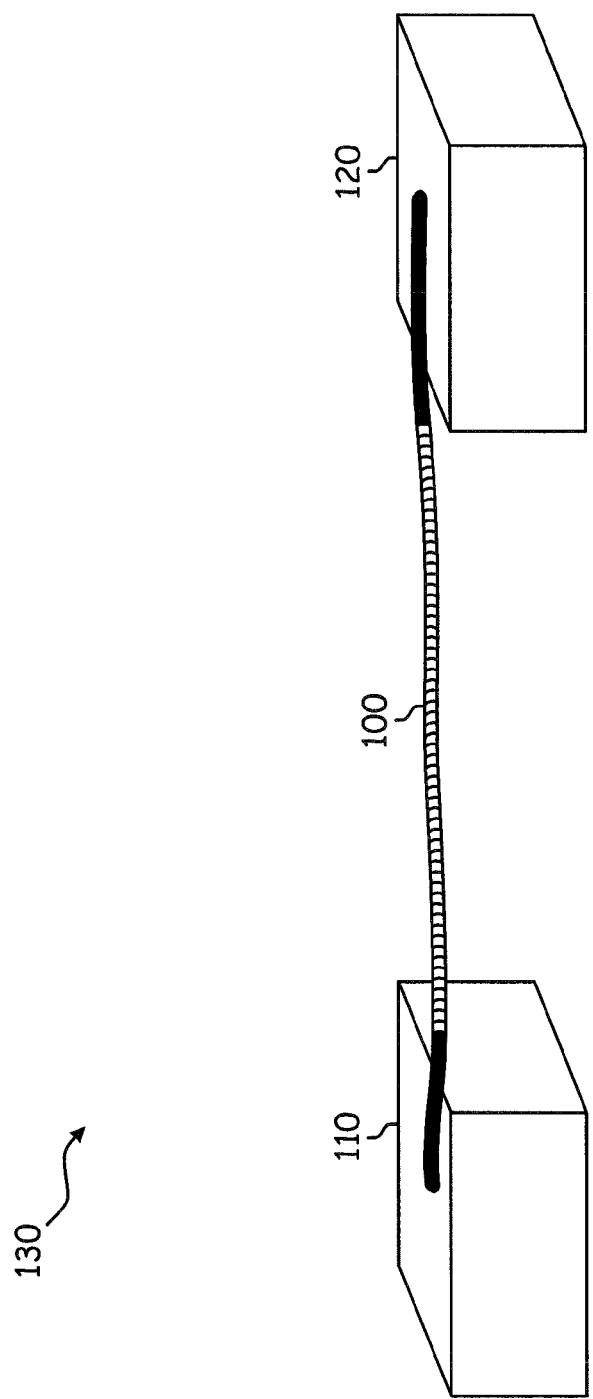
FIG. 1 is a perspective drawing showing a magnetic rail bond according to an illustrative embodiment of the present invention.

FIG. 1 shows a magnetic rail bond 130 according to an illustrative embodiment of the present invention. The rail bond 130 of FIG. 1 includes an electrically conductive cable 100 and two magnets 110, 120 mechanically and electrically coupled to the cable at both ends of the cable 100. In an illustrative embodiment of the invention, the magnets 110, 120 are comprised of a magnetic material that is plated with an electrically conductive material. In one exemplary embodiment of the invention, the magnetic material is neodymium and the electrically conductive plating is nickel. In alternative embodiments, the plating can also comprise copper, silver, platinum, gold, or any combination thereof. In another embodiment of the invention, the magnets 110, 120 are comprised of a magnetic material (such as alnico—an alloy comprised mainly of aluminum, nickel and cobalt) disposed between two pieces of steel (or other metal), the magnetic force firmly holding the pieces of steel to the magnetic material. In still another embodiment, the magnets 110 and 120 are made out of a material that is both highly magnetic and electrically conductive. While the magnets 110 and 120 of FIG. 1 are depicted as rectangular blocks, the magnets can be of any number of different shapes and sizes in accordance with the present invention. In an illustrative embodiment of the invention, the cable 100 is attached to each of the magnets 110, 120 with epoxy. This epoxy can be electrically conductive in one embodiment. The cable 100 can also be welded to the magnets 110, 120. In an alternative embodiment, the cable 100 is attached to the magnets 110, 120 as part of the manufacturing process of the magnets 110, 120. In other embodiments, the cable 100 is mechanically attached to the magnets via mechanical means such as bolt means, screw means, or other mechanical means. According to an illustrative embodiment of the present invention, the cable 100 is of a length that is appropriate for connecting the rail bond 130 across a rail joint, or the gap between the ends of longitudinally adjacent rail sections. As such, the cable can illustratively be in the range of 3-12 inches long. But again, this length range is merely illustrative and the cable can be of substantially any length in accordance with the invention. In another embodiment, the magnets 110 and 120 are connected not by a cable, but by a length of metal or other material that conducts electricity in a manner similar to an electrical cable 100.

Figure 3:
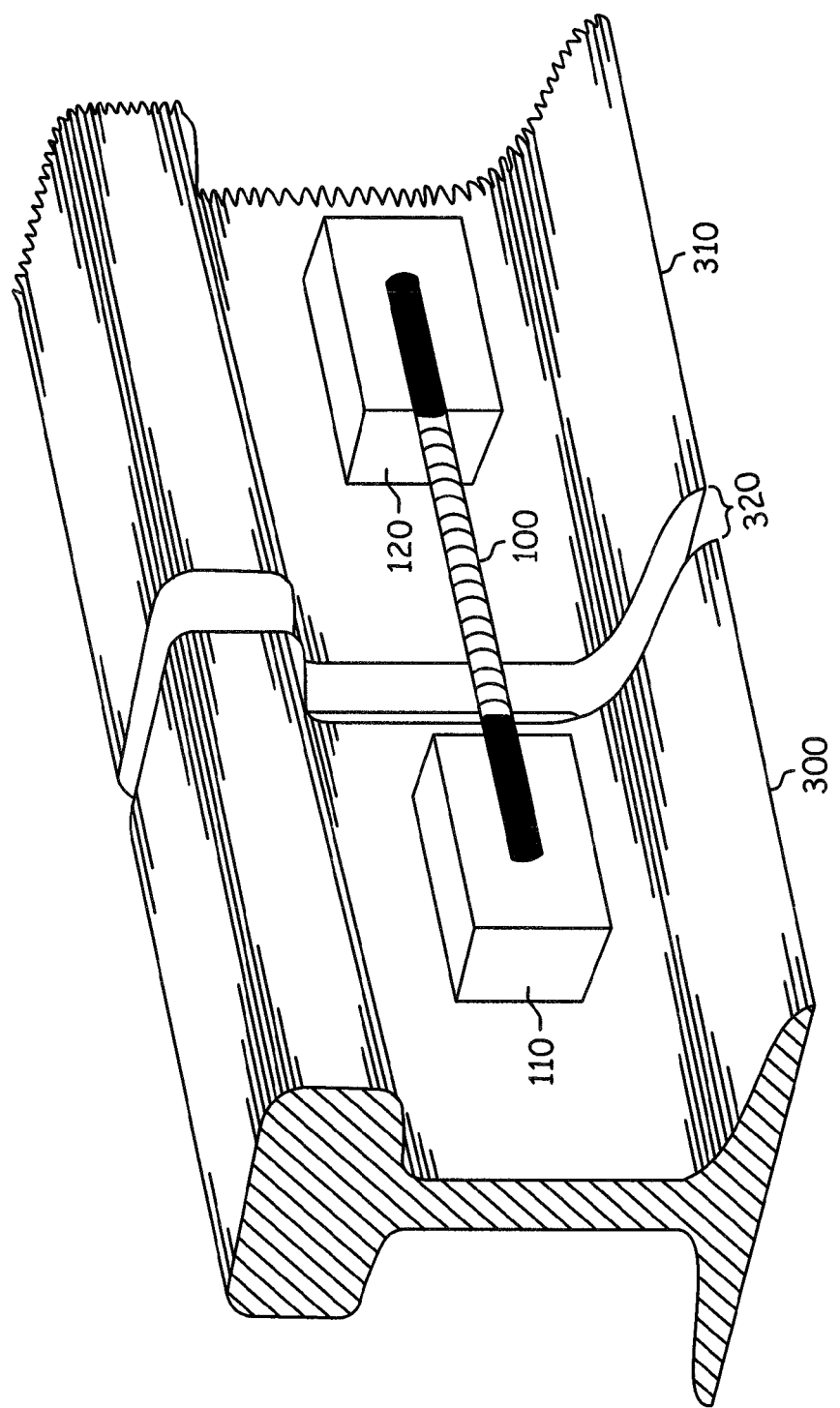
FIG. 3 is a perspective drawing showing a magnetic rail bond connected across a joint between two rail sections according to an illustrative embodiment of the present invention.

In operation, the rail bond 130 is connected across a rail joint, or the gap between the ends of longitudinally adjacent rail sections. This is depicted in FIG. 3. FIG. 3 shows the rail bond 130 of FIG. 1 connected across a gap 320 at the joint between rail section 300 and rail section 310. The magnet 110 is attached to rail section 300 by the attractive magnetic force between the magnet 110 and the rail section 300. Modern railroad rails are typically made of steel, which exhibits strong ferromagnetic properties. The magnet 120 is attached to rail section 310 in a similar manner. In the embodiment wherein the magnets 110, 120 comprise a magnetic material plated with an electrically conductive material, such as nickel, the attractive force between the magnetic material and the rail holds the electrically conductive plating in firm contact with the rail. In the alternative embodiment wherein the magnets 110, 120 are comprised of a magnetic material, such as alnico, disposed between two pieces of steel, the attractive force between the magnetic material and the rail holds the electrically conductive steel pieces in firm contact with the rail. The rail bond 130 thus forms an electrical connection across the gap 320 of the joint between rail sections 300 and 310. This electrical connection allows electrical control signals carried by the rails to traverse the rails unabated by joints exemplified by gap 320.

FIG. 3 shows the rail bond 130 being attached to the rail sections 300 and 310 at the web of said rail sections. The rail bond 130 can also be attached to the rails at the base of the rail or on the outside or underside of the rail head in accordance with the present invention. In one embodiment of the present invention, after magnetically attaching the magnets 110 and 120 to the rail sections 300 and 310, caulk or epoxy or some like substance is applied around the interface of the magnet to the rail. This can help to keep the connection between the magnet and the rail dry, and can further serve to strengthen the bond between the magnet and the rail. In another embodiment, this same role can be served by an electrically conductive adhesive.

Figure 2:
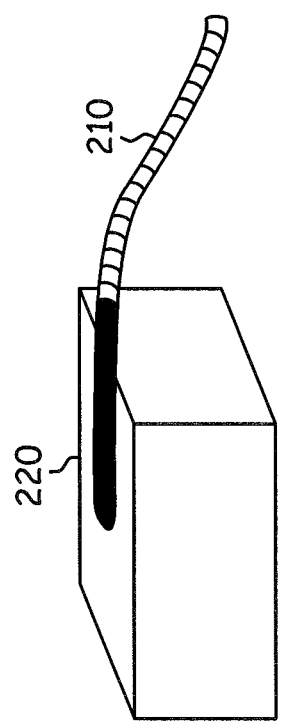
FIG. 2 is a perspective drawing showing a magnetic rail feed according to an illustrative embodiment of the present invention.

FIG. 2 shows a magnetic rail feed 200 according to an illustrative embodiment of the present invention. Rail feed 200 includes an electrically conductive cable 210 and a magnet 220 mechanically and electrically coupled to the cable 210. The cable 210 goes to a control case or other manner of electronic circuitry that transmits electrical signals to and/or receives electrical signals from a section of rail to which the magnet 220 attaches. In an illustrative embodiment of the invention, the magnet 220 is comprised of a magnetic material that is plated with an electrically conductive material. In one exemplary embodiment of the invention, the magnetic material is neodymium and the electrically conductive plating is nickel. In alternative embodiments, the plating can also comprise copper, silver, platinum, gold, or any combination thereof. In another embodiment of the invention, the magnet 220 is comprised of a magnetic material (such as alnico) disposed between two pieces of steel (or other metal), the magnetic force firmly holding the pieces of steel to the magnetic material. In still another embodiment, the magnet 220 is made out of a material that is both highly magnetic and electrically conductive. While the magnet 220 of FIG. 2 is depicted as a rectangular block, the magnet can be of any number of different shapes and sizes in accordance with the present invention. In an illustrative embodiment of the invention, the cable 210 is attached to the magnet 220 with epoxy. This epoxy can be electrically conductive in one embodiment. The cable 210 can also be welded to the magnet 220. In an alternative embodiment, the cable 210 is attached to the magnet as part of the manufacturing process of the magnet 220. In other embodiments, the cable 210 is mechanically attached to the magnet 220 via mechanical means such as bolt means, screw means, or other mechanical means. In operation, the magnet 220 magnetically attaches to a rail in much the same manner as the magnet 110 attaches to rail section 300 in FIG. 2. The magnet 220 can also be attached to the rail at the base of the rail or on the underside of the rail head in accordance with the present invention. In one embodiment of the present invention, after magnetically attaching the magnet 220 to the rail, caulk or epoxy or some like substance is applied around the interface of the magnet to the rail. In another embodiment, this same role can be served by an electrically conductive adhesive.

Figure 4:
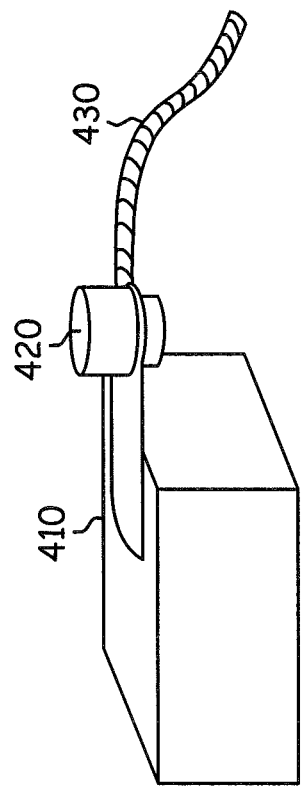
FIG. 4 is a perspective drawing showing a temporary magnetic rail bond assembly according to an illustrative embodiment of the present invention.

FIG. 4 shows a temporary magnetic rail bond assembly 400 in accordance with another embodiment of the present invention. The temporary magnetic rail bond assembly 400 comprises magnet 410 and a mechanical cable attachment apparatus 420. In an illustrative embodiment of the invention, the magnet 410 is comprised of a magnetic material that is plated with an electrically conductive material. In one exemplary embodiment of the invention, the magnetic material is neodymium and the electrically conductive plating is nickel. In alternative embodiments, the plating can also comprise copper, silver, platinum, gold, or any combination thereof. In another embodiment of the invention, the magnet 410 is comprised of a magnetic material (such as alnico) disposed between two pieces of steel (or other metal), the magnetic force firmly holding the pieces of steel to the magnetic material. In still another embodiment, the magnet 410 is made out of a material that is both highly magnetic and electrically conductive. While the magnet 410 of FIG. 4 is depicted as a rectangular block, the magnet can be of any number of different shapes and sizes in accordance with the present invention. In one embodiment of the invention, the mechanical cable attachment apparatus 420 is attached to the magnet 410 via welding. In an alternative embodiment, the mechanical cable attachment apparatus 420 is attached to the magnet 410 with epoxy. This epoxy is electrically conductive in one embodiment. In another embodiment, the mechanical cable attachment apparatus 420 is attached to the magnet 410 as part of the manufacturing process of the magnet 410. The temporary magnetic rail bond assembly 400 is intended to serve as a temporary replacement for a permanent rail bond whose cable 430 has been disengaged (broken off) from the permanent rail bond. The permanent rail bond from which the cable 430 has been disengaged may have been a magnetic rail bond or a standard prior art rail bond such as a welded rail bond or a bolted rail bond. In either case, the disengaged cable 430 is attached to the temporary magnetic rail bond assembly 400 via the mechanical cable attachment apparatus 420. The mechanical cable attachment apparatus 420 can comprise a screw assembly, a nut and bolt assembly, or some other mechanical attachment assembly. In the case of a nut and bolt assembly, for example, the bolt is tightened on the end of the disengaged cable 430 to securely attach and electrically couple the cable to the temporary magnetic rail bond assembly 400. The mechanical cable attachment apparatus 420 is made of an electrically conductive material so as to electrically couple the cable 430 to the magnet 410. In operation, the magnet 410 magnetically attaches to a rail in much the same manner as the magnet 110 attaches to rail section 300 in FIG. 2. The magnet 410 can also be attached to the rail at the base of the rail or on the underside of the rail head in accordance with the present invention.

Figure 5:
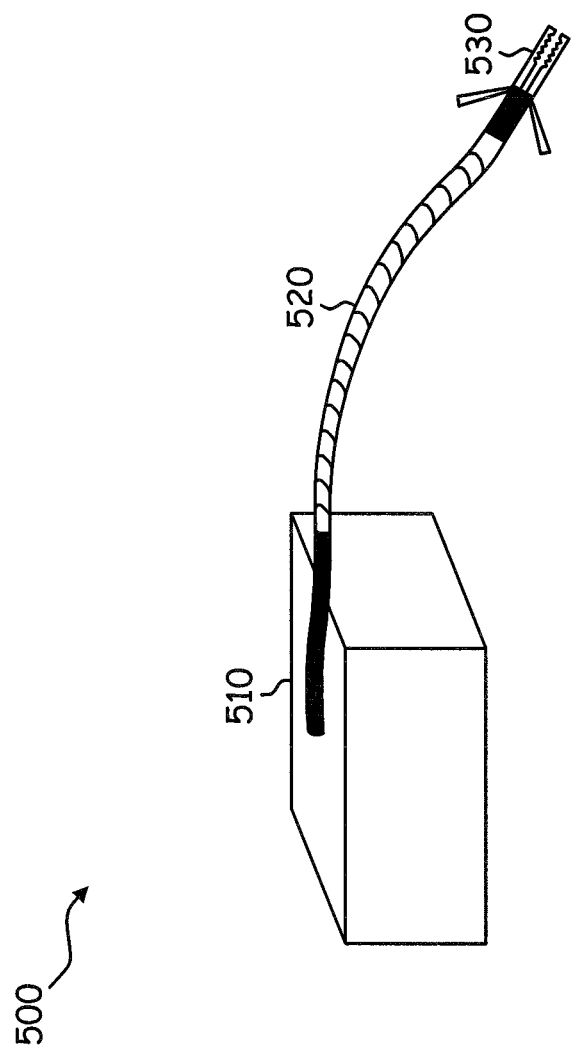
FIG. 5 is a perspective drawing showing a magnetic electrical connection maintainer according to an illustrative embodiment of the present invention.

FIG. 5 shows a magnetic electrical connection maintainer 500 according to another embodiment of the present invention. The magnetic electrical connection maintainer 500 comprises a magnet 510 that is mechanically and electrically coupled to an electrical cable 520. In an illustrative embodiment of the invention, the magnet 510 is comprised of a magnetic material that is plated with an electrically conductive material. In one exemplary embodiment of the invention, the magnetic material is neodymium and the electrically conductive plating is nickel. In alternative embodiments, the plating can also comprise copper, silver, platinum, gold, or any combination thereof. In another embodiment of the invention, the magnet 510 is comprised of a magnetic material (such as alnico) disposed between two pieces of steel (or other metal), the magnetic force firmly holding the pieces of steel to the magnetic material. In still another embodiment, the magnet 510 is made out of a material that is both highly magnetic and electrically conductive. While the magnet 510 of FIG. 5 is depicted as a rectangular block, the magnet can be of any number of different shapes and sizes in accordance with the present invention. Mechanically and electrically coupled to the other end of the cable 520 is an electrically conductive clamp 530. In an illustrative embodiment of the invention, the cable 520 is epoxied to the magnet 510, although other means of mechanically and electrically coupling the cable 520 to the magnet 510 are also contemplated, such as the various means described with respect to FIG. 1. The magnetic electrical connection maintainer 500 can be used to maintain an electrical connection between a rail and a rail feed when the rail feed is to be repaired or replaced. Say, for example, that a rail feed is to be replaced. In order to prevent the electrical connection from the control box to the rail from being broken, prior to removing the old rail feed, the magnet 510 is magnetically attached to the rail in much the same manner as the magnet 110 attaches to rail section 300 in FIG. 2. The magnet 510 can also be attached to the rail at the base of the rail or to the rail head in accordance with the present invention. The clamp 530 is clamped onto an exposed portion of the cable that goes to the control box. With the electrical connection maintainer 500 so disposed, the old rail feed can be removed without breaking the electrical connection from the control box to the rail. After the rail feed is replaced, the electrical connection maintainer 500 can be removed.

Figure 6:
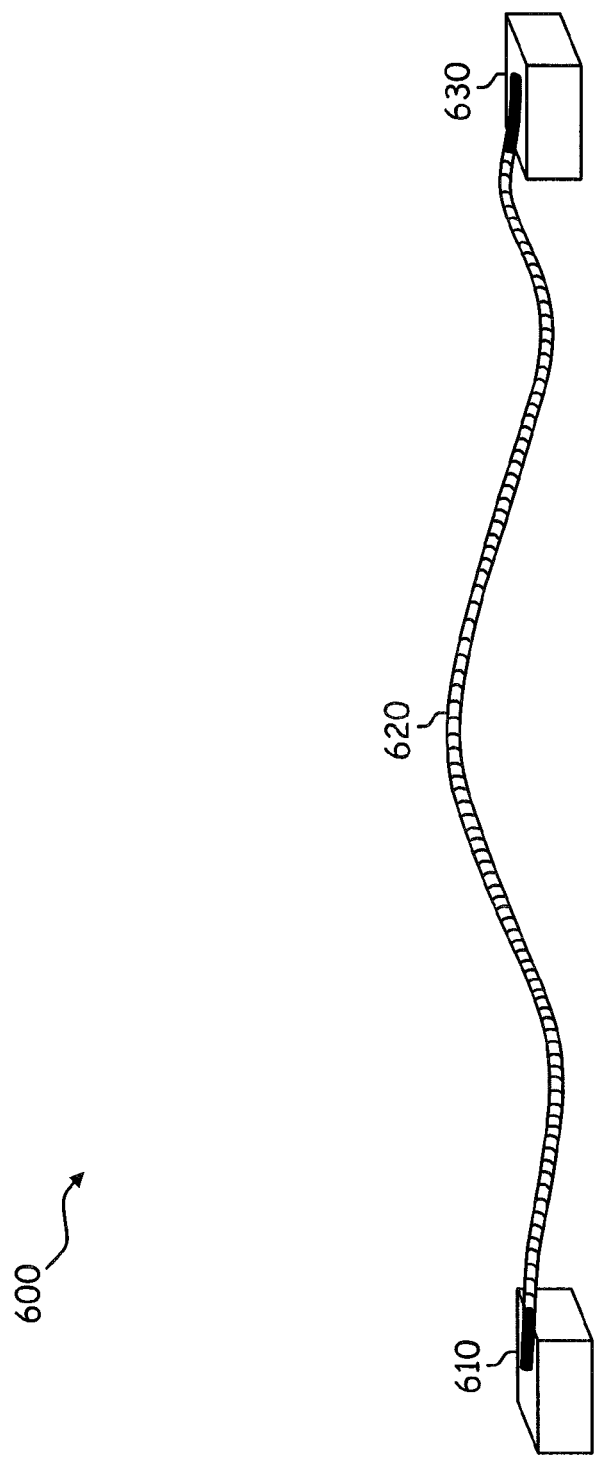
FIG. 6 is a perspective drawing showing a magnetic rail shunt according to an illustrative embodiment of the present invention.

FIG. 6 shows a magnetic rail shunt 600 according to another embodiment of the present invention. Magnetic rail shunt 600 includes an electrical cable 620 with two magnets 610 and 630 mechanically and electrically coupled to either end of the cable 620, as shown in FIG. 6. Note that the scale of FIG. 6 is larger than the scale of prior Figures. The magnets 610 and 630 are approximately the same size as the magnets shown in FIGS. 1-5, according to an illustrative embodiment of the present invention. In an illustrative embodiment of the invention, the magnets 610, 630 are comprised of a magnetic material that is plated with an electrically conductive material. In one exemplary embodiment of the invention, the magnetic material is neodymium and the electrically conductive plating is nickel. In alternative embodiments, the plating can also comprise copper, silver, platinum, gold, or any combination thereof. In another embodiment of the invention, the magnets 610, 630 are comprised of a magnetic material (such as alnico) disposed between two pieces of steel (or other metal), the magnetic force firmly holding the pieces of steel to the magnetic material. In still another embodiment, the magnets 610 and 630 are made out of a material that is both highly magnetic and electrically conductive. While the magnet 610 of FIG. 6 is depicted as a rectangular block, the magnet can be of any number of different shapes and sizes in accordance with the present invention. In an illustrative embodiment of the invention, the ends of cable 620 are epoxied to magnets 610 and 630, although other means of mechanically and electrically coupling the cable 620 to the magnets 610, 630 are also contemplated, such as the various means described with respect to FIG. 1. In operation, the magnetic rail shunt 600 is used to electrically couple the two parallel rails that comprise a railroad track. To do this, magnet 610 is magnetically attached to one of the rails and the magnet 630 is magnetically attached to the other rail. The magnets 610 and 630 can be attached to their respective rails at the top of the rail, at the base of the rail, or at the rail web in accordance with the present invention. Thus, in one embodiment, the cable 620 is of a length that is appropriate for spanning the two parallel rails of a railroad track. In one embodiment of the present invention, the magnetic rail shunt 600 is used to simulate the presence of train wheels on the rails of the railroad track. As described previously, in a track circuit, when a train is present, its wheels and axle electrically short the circuit formed by the rails. This shorting of the circuit indicates the presence of a train on the section of track. For maintenance and testing purposes, it is sometimes beneficial to simulate this shorting of the circuit by the train wheels without the actual presence of a train. In another embodiment of the invention, a magnetic rail shunt such as rail shunt 600 is used to electrically couple two rails on the same side of a track in an end-to-end fashion. This implementation can be employed to maintain the track circuit in the event of a missing rail or an open rail splice. In this embodiment of a magnetic rail shunt 600, the cable 620 can be of any length necessary to span the missing rail or open rail splice. The magnetic rail shunt 600 offers quick and immediate shunt simulations without the need for wrenches, T-handles or set screw operations as required with prior art shunt apparatus. The magnetic rail shunt 600 also offers an ease of the "bobble" effect to simulate train detection of grade crossing predictors.

Figure 7:
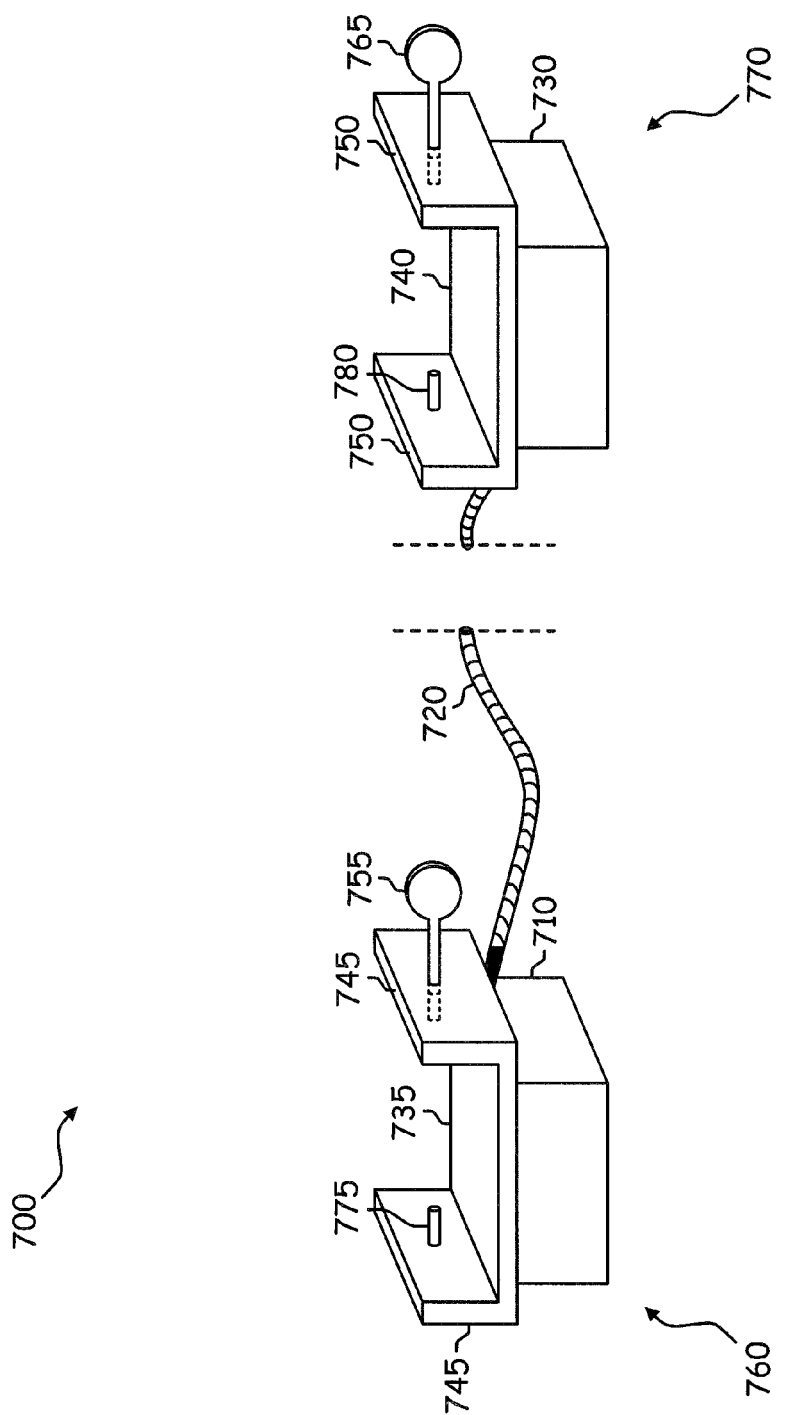
FIG. 7 is a perspective drawing showing a dual-mode magnetic rail shunt according to an illustrative embodiment of the present invention.

FIG. 7 shows a magnetic rail shunt 700 according to another embodiment of the present invention. Magnetic rail shunt 700 includes an electrical cable 720 with two magnets 710 and 730 mechanically and electrically coupled to either end of the cable 720, in a manner similar to the magnetic rail shunt 600 of FIG. 6. Also mechanically and electrically coupled to the magnet 710 and the electrical cable 720 is a mechanical rail attachment device 735. A second mechanical rail attachment device 740 is mechanically and electrically coupled to the magnet 730 and the electrical cable 720. The mechanical rail attachment devices 735 and 740 are sometimes referred to as "rustbusters." The mechanical rail attachment devices 735 and 740 offer an alternative means of attaching to the rail in addition to the magnet means as described with respect to FIG. 6. The dual-mode rail attachment assemblies 760 and 770 can be attached to their respective rails using the magnets 710 and 730 as described with regard to FIG. 6. To attach the dual-mode rail attachment assemblies 760 and 770 to their respective rails using the mechanical rail attachment devices 735 and 740, the dual-mode rail attachment assemblies 760 and 770 are turned upside-down relative to their orientation shown in FIG. 7 and placed over their respective rails. The sides 745 and 750 of the mechanical rail attachment devices 735 and 740 thus extend down vertically around the sides of their respective rails. Bolt or screw mechanisms 755 and 765 are then tightened to secure the mechanical rail attachment devices 735 and 740 to their respective rails. The bolt and screw mechanisms 755, 765, and pegs 775, 780 serve to securely attach, and electrically couple, the mechanical rail attachment devices 735 and 740 to their respective rails. The bolt and screw mechanisms 755, 765, and pegs 775, 780 also help to penetrate rust to allow a solid electrical connection between the mechanical rail attachment devices 735 and 740 and their respective rails. The mechanical rail attachment devices 735 and 740, including the bolt and screw mechanisms 755, 765, and pegs 775, 780, are made of an electrically conductive material In an alternative embodiment of the magnetic rail shunt 700 shown in FIG. 7, there are two electrical cables mechanically and electrically coupled to the dual-mode rail attachment assembly 760. Each of those cables is in turn coupled to separate dual-mode rail attachment assemblies similar to dual-mode rail attachment assembly 770. In this way, this alternative embodiment provides essentially two shunts in one shunt apparatus. The shunts in this alternative embodiment have different resistances. For example, in one embodiment, one of the shunts has a resistance of approximately 0.06Ω and the other has a resistance of approximately 0.0Ω. In this alternative embodiment, the user applying the magnetic rail shunt can choose which of the shunts to deploy to effect different electrical characteristics of the shunt connection.

The present invention's magnetic means of bonding an electrical connection to a rail provides many advantages over prior art means such as welding and mechanical bonding means. One such advantage is safety. There is no danger from molten metal splatter or of starting fires as there is with welding bonding means. And magnetic rail bond installation requires no hammer and chisel as many mechanical bonding means do. Also, the magnetic bonding means of the present invention does not apply stress to the rail as both welding and mechanical bonding means do. The magnetic bonding means avoids the damage caused by the extremities of high temperatures inherent with welding and also avoids the damage caused by drilling holes in the rail. The magnetic bonding means also makes it easier to remove a rail bond without damaging the rail. The present invention also provides a quick and easy installation. Another advantage of the magnetic rail bonding means of the present invention is that it is suitable for permanent installation as well as temporary deployment. Additionally, the magnetic rail bond can be applied in substantially any climatic conditions. This is not the case with welded rail bonds which cannot be applied in wet conditions. The present invention also increases the ease of maintenance; the magnetic rail bond can be easily removed, cleaned, and reapplied.

While the present invention has been described with reference to certain embodiments, it will be understood by those skilled in the art that various changes can be made and equivalents can be substituted without departing from the scope of the present invention. It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

The invention claimed is:

1. A method of forming an electrical connection between an electrical conductor and a railway, comprising:
   providing an electrically-conductive magnet assembly coupled to an end of an electrical conductor, wherein said electrically-conductive magnet assembly comprises a permanent magnet; and
   coupling the electrically-conductive magnet assembly to a railway via a permanent magnetic force from the permanent magnet, whereby the magnetic coupling of the magnet assembly to the rail causes the rail to be electrically coupled to the electrically-conductive magnet assembly, and, in turn, to the electrical conductor.

2. The method of claim 1 wherein a second end of the electrical conductor is coupled to control circuitry operable to transmit an electrical signal to the rail via the electrical conductor and the electrically-conductive magnet assembly.

3. The method of claim 1 wherein a second end of the electrical conductor is coupled to an electrically-conductive clamp.

4. The method of claim 1 wherein the electrically-conductive magnet assembly comprises a ferromagnetic material plated with an electrically-conductive material.

5. The method of claim 1 wherein the electrical conductor comprises a cable.

6. A rail feed system comprising:
an electrically-conductive magnet assembly comprising a permanent magnet; and
an electrical conductor coupled to the electrically-conductive magnet assembly; and
a train railway rail, wherein the electrically-conductive magnet assembly is coupled to a railway via permanent magnetic force, whereby the magnetic coupling of the magnet assembly to the rail causes the rail to be electrically coupled to the electrically-coupled magnet assembly, and, in turn, to the electrical conductor.

7. The rail feed system of claim 6 wherein a second end of the electrical conductor is coupled to control circuitry operable to transmit an electrical signal to the rail via the electrical conductor and the electrically-conductive magnet assembly.

8. The rail feed system of claim 6 further comprising an electrically-conductive clamp coupled to a second end of the electrical conductor.

9. The rail feed system of claim 6 wherein the electrically-conductive magnet assembly comprises a ferromagnetic material plated with an electrically-conductive material.

10. The rail feed Systemof claim 6 wherein the electrical conductor comprises a cable.

11. A method of forming an electrical connection between railway rails, comprising:
providing a rail bond comprising an electrical conductor, a first electrically-conductive magnet assembly comprising a first permanent magnet coupled to a first end of the electrical conductor, and a second electrically-conductive magnet assembly comprising a second permanent magnet coupled to a second end of the electrical conductor;
coupling the first electrically-conductive magnet assembly to a first railway rail via a first magnetic force from the first permanent magnet, whereby the magnetic coupling of the first magnet assembly to the first rail causes the first rail to be electrically coupled to the first electrically-conductive magnet assembly, and, in turn, to the electrical conductor; and
coupling the second electrically-conductive magnet assembly to a second railway rail via a second magnetic force from the second permanent magnet, whereby the magnetic coupling of the second magnet assembly to the second rail causes the second rail to be electrically coupled to the second electrically-conductive magnet assembly, and, in turn, to the electrical conductor.

12. The method of claim 11 wherein the first railway rail longitudinally adjacent to the second railway rail.

13. The method of claim 11 wherein the first and second rails comprise two parallel rails of a railway.

14. The method of claim 11 wherein the first and second electrically-conductive magnet assemblies each comprise a ferromagnetic material plated with an electrically-conductive material.

15. The method of claim 11 wherein the electrical conductor comprises a cable.

16. A rail bond system comprising:
an electrical conductor;
a first electrically-conductive magnet assembly comprising a first permanent magnet coupled to a first end of the electrical conductor; and
a second electrically-conductive magnet assembly comprising a second permanent magnet coupled to a second end of the electrical conductor, wherein the first electrically-conductive magnet assembly is coupled to a first railway rail via a first magnetic force from the first permanent magnet, whereby the magnetic coupling of the first magnet assembly to the first rail causes the first rail to be electrically coupled to the first electrically-conductive magnet assembly, and, in turn, to the electrical conductor.

17. The rail bond system of claim 16 wherein the second electrically-conductive magnet assembly is coupled to a second railway rail via a second magnetic force from the second permanent magnet, whereby the magnetic coupling of the second magnet assembly to the second rail causes the second rail to be electrically coupled to the second electrically-conductive magnet assembly, and, in turn, to the electrical conductor.

18. The rail bond system of claim 17 wherein the first railway rail is longitudinally adjacent to the second railway rail.

19. The rail bond system of claim 17 wherein the first and second rails comprise two parallel rails of a railway.

20. The rail bond system of claim 16 wherein the first and second electrically-conductive magnet assemblies each comprise a ferromagnetic material plated with an electrically-conductive material.

21. The rail bond of system claim 16 wherein the electrical conductor comprises a cable.

* * * * *